May 7, 1929.　　　　J. R. BURCH　　　　1,711,918
POPCORN MACHINE
Filed Oct. 25, 1926　　　2 Sheets-Sheet 1

INVENTOR
Julian R. Burch.
By Ralph Karch
ATTORNEY

May 7, 1929.          J. R. BURCH          1,711,918
POPCORN MACHINE
Filed Oct. 25, 1926          2 Sheets-Sheet 2

INVENTOR
Julian R. Burch.
By
ATTORNEY

Patented May 7, 1929.

1,711,918

UNITED STATES PATENT OFFICE.

JULIAN R. BURCH, OF ST. LOUIS, MISSOURI, ASSIGNOR TO STAR MANUFACTURING COMPANY, OF ST. LOUIS, MISSOURI, A CORPORATION OF MISSOURI.

POP-CORN MACHINE.

Application filed October 25, 1926. Serial No. 144,153.

This invention relates generally to popcorn machines and, more particularly, to certain new and useful improvements in popcorn machines of electrically operated type.

My present invention has for an object the provision of a popcorn machine of the type stated in which the kettle is so constructed and receptacles for the corn to be popped and its seasoning and flavoring are so relatively placed and positioned that the kettle may, with great ease and convenience, be supplied with raw material.

My present invention has for a further object the provision of a popcorn machine of the type stated in which the kettle is so constructed that the popped contents thereof may be conveniently discharged without manipulation of the kettle proper.

My present invention has for a further object the provision of a popcorn machine which is compact and durable in the form and structure and which is highly efficient in the performance of its intended functions.

My present invention has for a still further object the improvement and simplification generally of popcorn machines of the type mentioned.

And with the above and other objects in view, my invention resides in the novel features of form, construction, arrangement, and combination of parts hereinafter described and pointed out in the claims.

In the accompanying drawing,—

Figure 1:
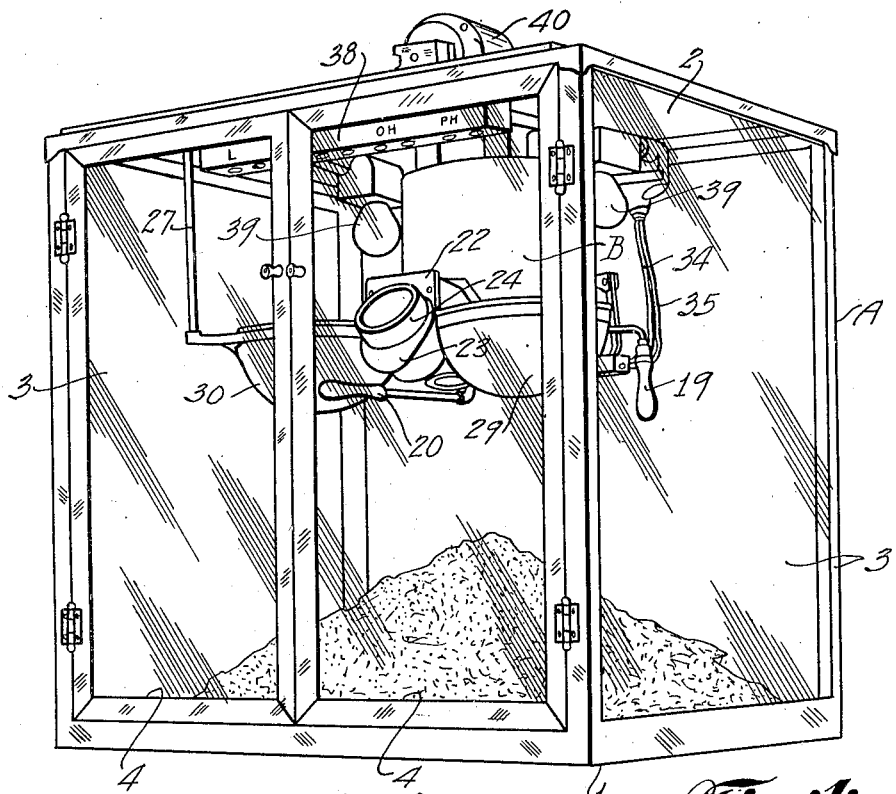
Figure 1 is a perspective view of a popcorn machine constructed in accordance with and embodying my invention.

Referring now more in detail and by reference characters to the drawings, which illustrate a preferred embodiment of my invention, the machine preferably includes a housing or casing A preferably rectangular in contour and comprising a bottom wall 1, a top wall 2, and side and back walls 3, the latter being constructed largely of sections of glass or other suitable transparent material, to expose to view the contents of the housing, and one of said side walls 3 consisting of a pair of co-operating swingable doors 4, 4, for obvious purposes.

Disposed within the housing A, is a corn-popping receptacle or so-called kettle B preferably constructed of aluminum or other suitable metallic material and preferably cylindrical or tubular in contour with its one or upper end permanently closed by a preferably integral end wall 5, and engaging, and, as by nuts 6, secured in engagement with, the kettle-wall 5 and the housing top-wall 2, are tubular or pipe sections 7, sleeved upon which intermediate the kettle-wall 5 and the housing-wall 2, are collars 8 for suitably spacing the kettle B from the housing top-wall 2. The pipe-sections 7 open at their opposite ends upon the housing-wall 2 and into the kettle B, and the pipe-sections 7 and their said associated parts thus function not only to secure the kettle B in fixed depending relation within the housing A, but also to provide outlet or vent-passages or openings to the exterior for odors or the like arising from the popping or popped contents of the kettle.

Preferably integral with or otherwise fixed to, and projecting from the lower marginal end of, the main or side wall 9 of the kettle B, is a pair of ears 10, 10, suitably spaced circumferentially of kettle-wall 9 for co-operation with the correspondingly spaced ears 11, 11, of an annularly flanged or cup-shaped member 12 adapted to form and provide not only a closure for the otherwise open lower end of kettle B, but also a swingable wall for supporting the corn while being popped and for discharging the corn, when popped, from the kettle, the ears 10 and 11 being hingedly connected together by a pintle 13.

Figure 3:
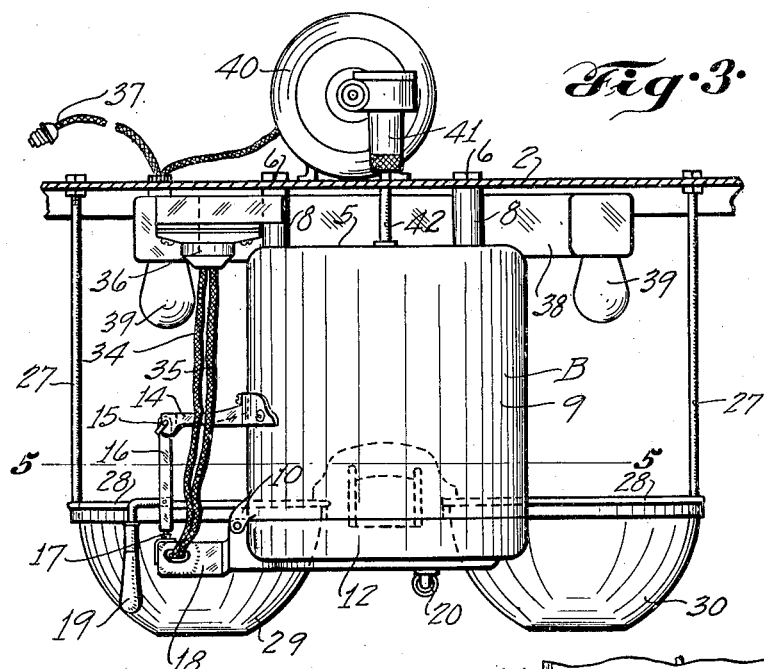
Figure 3 is an enlarged elevational view of the machine, the housing or casing thereof being partly in section and partly omitted.
Figure 4:
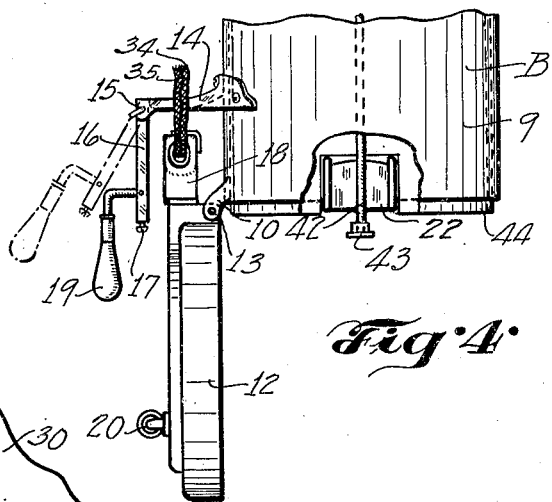
Figure 4 is a fragmental elevation view of the kettle or popping receptacle, with its swingable base or bottom wall in open position.

Suitably fixed to the kettle-wall 9 at a suitable distance upwardly from its lower margin, is a radially disposed bracket 14, hinged to the outer end of which, as at 15, is the upper end of a bar-section 16 provided at its other or lower end with a preferably spring-pressed or yielding button 17 adapted normally to bear upon and engage with the outer marginal portion of a radial enlargement 18 upon the closure 12 to retain the closure 12 in normal horizontally disposed kettle-closing position, as best seen in Figure 3. Suitably fixed or secured to the bar 16 and the closure 12, are grasping-handles 19 and 20, respectively, for facilitating convenient swingable manipulation thereof.

Figure 2:
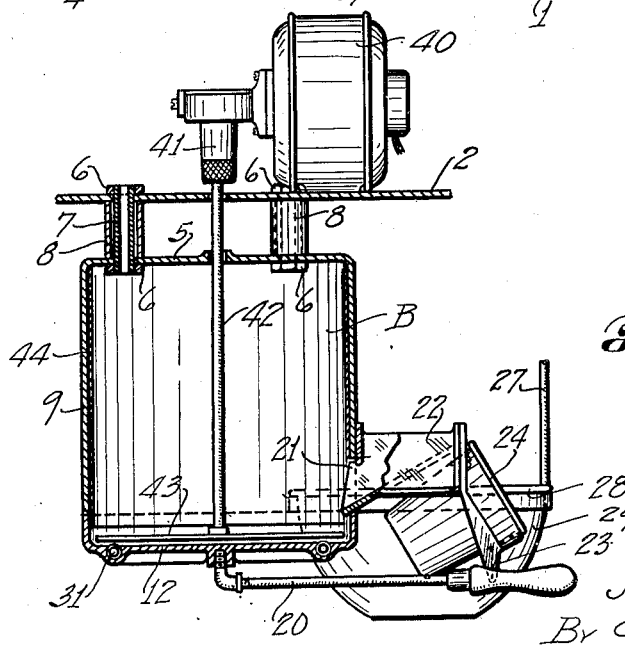
Figure 2 is an enlarged fragmental vertical sectional view of the machine.

Suitably fixed to or mounted upon the kettle B and leading into the kettle adjacent its lower end through an opening 21 provided in its wall 9 for the purpose, as best seen in Figure 2, is a hopper 22, conjoined to which is an obliquely outwardly depending tubular rest 23 for removably supporting a cup 24 adapted to contain, in convenient handy relation to kettle B, salt or other flavoring for the corn being popped. And fixed, as 25, 26, to kettle B and braced by tie-rods 27, 27, depending from the housing top-wall 2, as best seen in Figure 3, are horizontally disposed ring-members 28, 28, adapted to removably support receptacles 29, 30, adapted to contain, also in convenient handy relation to kettle B and its hopper 22, respectively, the corn to be popped and fluid-butter or other seasoning or the like.

Figure 5:
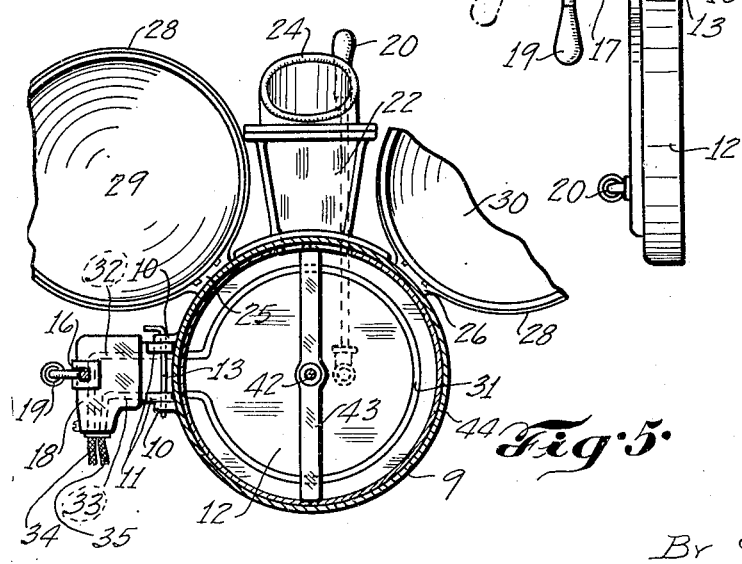
Figure 5 is a detail sectional plan view taken approximately on the line 5—5, Figure 3.

Suitably cast or built in the kettle closure-member 12, is a heating unit 31 of preferably any suitable electric type, whose terminals 32, 33, lead into the closure enlargement 18, as best seen in Figure 5, where they are adapted for electrical engagement with connecting-wires 34, 35, leading from a suitable switch 36 adapted, in turn, for inclusion in any suitable service-circuit by means of a plug-extension 37. Suitably served also by the extension 37, is a plurality of switch-terminals 38, by which one or more electric or incandescent bulbs 39 may be energized, as may be desired by the operator or popcorn-vendor, as well as also a motor 40 suitably mounted upon the housing A and whose shaft is suitably connected, as at 41, with a shaft 42 depending into the kettle B and equipped at its lower end with a blade or paddle 43 disposed horizontally of the kettle for stirring and mixing the popping corn and its seasoning and flavoring.

The usefulness and practical convenience of my machine will be apparent from the foregoing description. The corn to be popped and suitable seasoning and flavoring are in practice disposed closely adjacent the stationary kettle B, into which they may with little effort be poured or placed and in such quantities and proportions as may be desired. The unit 31, when energized, imparts sufficient heat to the kettle-contained corn to effect proper popping, after which, by easy release only of the closure 12 by manipulation through handle 19 of bar 16, the closure 12 automatically through gravity drops to open position and thereby discharges into the housing A and upon its bottom-wall 1 the popped corn, convenient access into the housing A for removal of the popped corn and for manipulation of the working parts of the machine being permitted by the doors 4. I may state here that the pintle 13 is preferably removably engaged with the ears 10, 11, so as to facilitate any necessary cleaning, repairs or replacement of the closure 12 and its associated parts; and fixed or disposed within the kettle B, is a suitable cylindrical lining 44 which projects at its lower margin below the lower end of the kettle and, as shown, overlies the joint between the kettle and its closure 12 when the closure is in normal kettle-closing position, the lining 44 functioning to direct into the closure 12 for convenient removal any fluid grease or the like and to at the same time prevent the escape thereof through the said covered joint.

My new machine is comparatively simple in form and structure, is highly sanitary and cleanly, is compact and durable, and is efficient and convenient in the performance of its intended functions.

I am aware that changes in the form, construction, arrangement, and combination of the several parts of my machine may be made and substituted for those herein shown and described without departing from the nature and principle of my invention.

Having thus described my invention, what I claim and desire to secure by Letters Patent is:

1. In a popcorn machine, a stationary kettle open at its lower end and having an inlet-opening in the side wall thereof, in combination with a member hingedly connected to the kettle for providing a swingable closure for the open end of the kettle and a discharging-support for the contents of the kettle, and means including an electric heating unit mounted in said closure for supplying popping heat to the corn within the kettle.

2. In a popcorn machine, in combination, a housing, a kettle depending in fixed relation within the housing, the kettle being open at its lower end and having an inlet-opening in its side wall, a member pivotally attached to the kettle for providing a swingable closure for the open end thereof and a discharging-support for the contents of the kettle, and means including an electric heating unit disposed within said closure-member for supplying popping heat to the corn within the kettle.

3. In a popcorn machine, a housing, a kettle disposed within the housing, and means including tubular members opening both upon the housing and within the kettle for both securing the kettle in fixed depending relation within the housing, and supplying vapor-discharge vents for the kettle.

4. In a popcorn machine, a kettle having an opening in its lower end, a member hingedly secured to the kettle for providing a swingable closure for said opening, the closure-member having a radial enlargement, a bracket projecting radially from the kettle, and a bar swingably secured to the bracket and adapted for releasable engagement with said enlargement for retaining the closure-member in kettle-closing position.

5. In a popcorn machine, the combination with a kettle open at its lower end, of a closure pivotally attached to the kettle for swingably closing said lower end thereof, and a lining disposed within the kettle and adapted to overlie the joint between the kettle and its said closure.

6. A popcorn machine including a support and a kettle fixed upon the support, the kettle having a hopper-equipped supply-opening in its side wall, in combination with a ring-shaped receptacle-support fixed to and projecting horizontally outwardly from the kettle in adjacent relation to said opening.

7. A popcorn machine including a support and a kettle fixed upon the support, the kettle having a hopper-equipped supply-opening in its side wall, in combination with a pair of ring-shaped receptacle supports fixed to and projecting horizontally outwardly from the kettle in adjacent relation to and upon opposite sides of said opening.

8. In a popcorn machine including a support, a popping-kettle fixed upon the support and having a supply-opening in its side wall, a hopper fixed upon and discharging through said opening into the kettle, and a tubular rest depending from and conjoined to the hopper for supporting a receptacle in convenient relation thereto.

9. In a popcorn machine, a popping-kettle having an opening, in combination with a member hingedly attached to the kettle for providing a swingable closure for said opening, and means including an electrical heating unit mounted in said closure for supplying popping heat to the corn within the kettle.

10. In a popcorn machine, a popping kettle having a discharge-opening in its lower end, in combination with a member hingedly attached to the kettle for providing a swingable closure for said opening and a discharging support for the contents of the kettle, and means including an electrical heating unit mounted in said closure for supplying popping heat to the corn within the kettle.

In testimony whereof, I have signed my name to this specification.

JULIAN R. BURCH.